US006816752B1

(12) United States Patent
Wang

(10) Patent No.: US 6,816,752 B1
(45) Date of Patent: Nov. 9, 2004

(54) ELECTRONIC INFORMATION VENDING MACHINE AND METHOD

(75) Inventor: Wayne Wang, Cupertino, CA (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/366,365

(22) Filed: Feb. 14, 2003

Related U.S. Application Data

(63) Continuation of application No. 09/562,323, filed on May 1, 2000, now Pat. No. 6,535,791.

(51) Int. Cl.[7] .................................................. G06F 7/00
(52) U.S. Cl. ....................................... 700/235; 700/241
(58) Field of Search ................................ 700/232, 233, 700/235, 241; 400/70, 76; 395/200.3

(56) References Cited

U.S. PATENT DOCUMENTS 5,884,140 A * 3/1999 Ishizaki et al. ............ 455/2.01
6,181,893 B1 1/2001 Collard et al.
6,535,791 B1 * 3/2003 Wang ......................... 700/235

* cited by examiner

*Primary Examiner*—Khoi H. Tran
(74) *Attorney, Agent, or Firm*—Oblon, Spivak, McClelland, Maier & Neustadt, P.C.

(57) ABSTRACT

A method and apparatus for providing information that generally includes retrieving or receiving a block of electronic information from a remote information source at a predetermined time. The block of electronic information retrieved from the remote source is stored on a data storage unit. A user interface is provided that is configured to produce a selection signal based upon an input from a user regarding the information intended for purchase by the user. A step of receiving and verifying a payment is performed based upon the selection signal input by the user. Once payment is verified, the electronic information corresponding to the materials being purchased is retrieved from the data storage unit based upon the selection signal. The portion of the block of electronic information selected by the user for purchase is then printed on a medium and dispensed to the user.

20 Claims, 5 Drawing Sheets

ELECTRONIC INFORMATION VENDING MACHINE AND METHOD

This is a Continuation of application Ser. No. 09/562,323 Filed on May 1, 2000 now U.S. Pat. No. 6,535,791.

BACKGROUND OF THE INVENTION

1. Field of the Invention

The present invention relates generally to a vending machine adapted to provide for the purchase of various forms of information. More specifically, the vending machine is adapted to receive an updated selection of electronic information via a remote information source and provide for the sale a printed medium of that information.

2. Discussion of the Background

There are several options available to consumers who wish to purchase various forms of information. Consumers who wish to have access to daily newspapers or periodicals such as magazines can either purchase such information from a store or from a newsstand. However, these options are not always ideal for consumers, or for the companies attempting to sell such information to these consumers. For example, maintaining and operating a store or newsstand can be an expensive endeavor for a vendor. The availability of locations of such stores are frequently limited by local zoning ordinances or by the owner of the premises. The vendors are also limited by the amount of space available to stock items, which thereby limits the size and variety of the selection that is available to consumers for purchase. There are also large costs to the original seller of the information in printing and then distributing and shipping large quantities of newspapers, magazines, books, etc., to each vendor.

Recently the Internet has provided consumers with access to a broad variety of information that was previously difficult or impossible to find. The Internet has provided sellers of books, magazines, periodicals, etc., with the ability to provide access to consumers of a huge variety of materials without the cost of distributing hard copies of the materials to a large network of vendors. However, in order for a consumer to have access to such a wealth of information, the consumer must have access to the Internet. Accordingly, there is a need for a device that provides convenient access to such a wealth of information.

Even for consumers with access to the Internet, the consumer either has the option of downloading and printing the information or having the seller ship a hardcopy of the material to the consumer. Clearly the option of shipping the material has disadvantages to the seller and the consumer of cost and delay in receipt of the materials. Additionally, the option of downloading and printing the information requires that the consumer have access to various hardware such as a computer and a printer, and that the consumer have access to the Internet at the moment the consumer wishes to purchase the material. Furthermore, the process of downloading and printing information can be a time consuming endeavor, especially when the information is downloaded and printed on a piecemeal basis for each individual consumer.

SUMMARY OF THE INVENTION

The present invention advantageously provides an electronic information vending machine and method that allows users to purchase various forms of information, such as newspapers, magazines, books, etc., quickly and conveniently at a vending machine or kiosk-type device.

The invention retrieves a block of information from the remote source and stores that block of information for later purchase by a user of a portion of the stored block of information. The invention thereby allows a user to quickly access the stored information and quickly print out a copy of the information without having to wait for the information to be downloaded on a piecemeal basis as each user selects an item, which can be a time consuming endeavor. The vending machine can retrieve the block of information at a time when the vending machine would not normally have a high volume of use, thereby limiting any disruption to the normal use of the machine.

The invention achieves the above advantageous results utilizing a method and apparatus for providing information that generally includes retrieving a block of electronic information from a remote information source at a predetermined time. The block of electronic information retrieved from the remote source is stored on a data storage unit, for example a high capacity hard disk. A user interface is provided that is configured to produce a selection signal based upon an input from a user regarding the information intended for purchase by the user. The present invention performs a step of receiving and verifying a payment based upon the selection signal input by the user. Once payment is verified, the electronic information corresponding to the materials being purchased is retrieved from the data storage unit based upon the selection signal. The portion of the block of electronic information selected by the user for purchase is then printed on a medium and dispensed to the user.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENT

Figure 1:
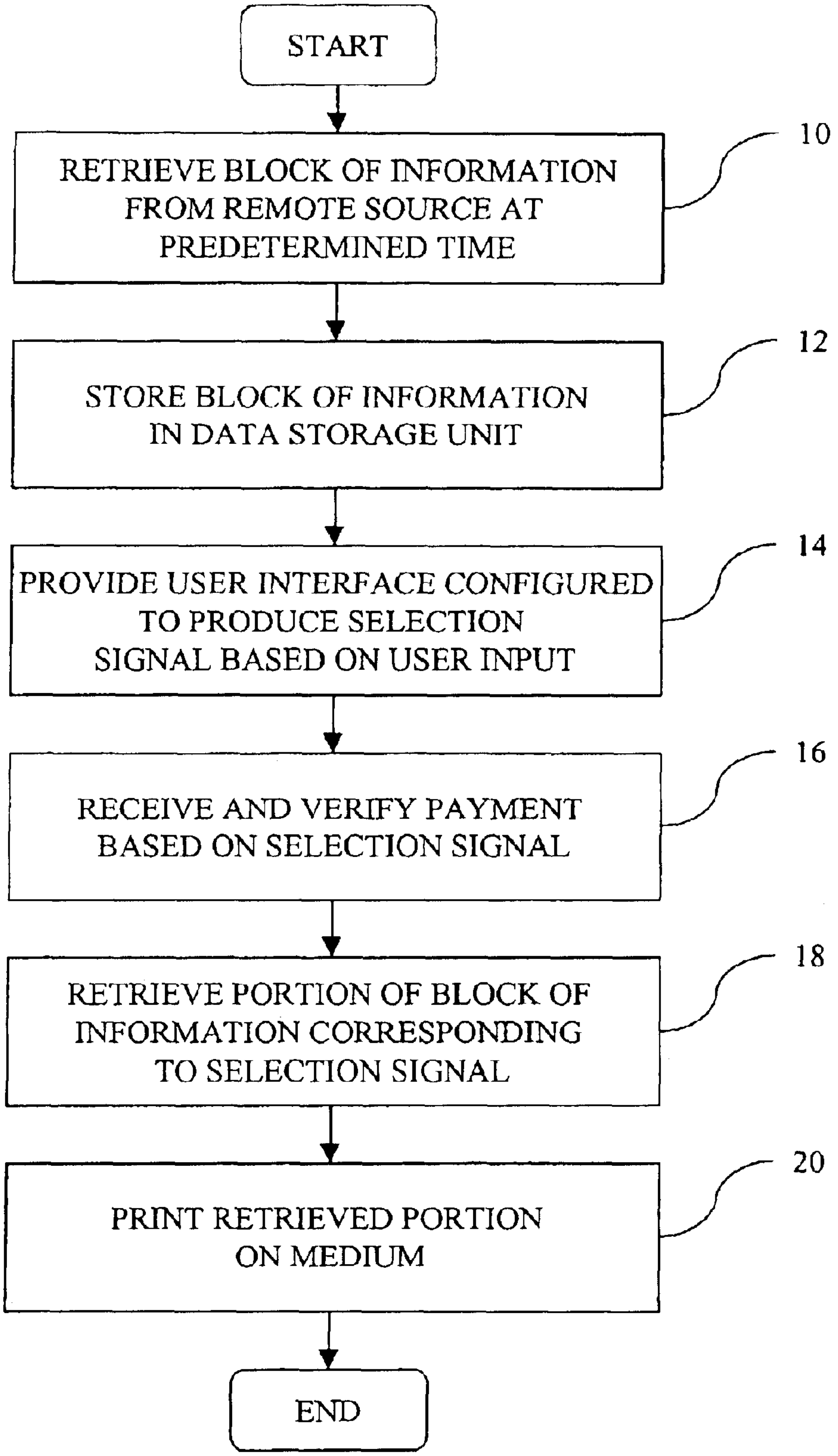
FIG. 1 is a flow diagram representing a method of providing information according to the present invention.
Figure 4:
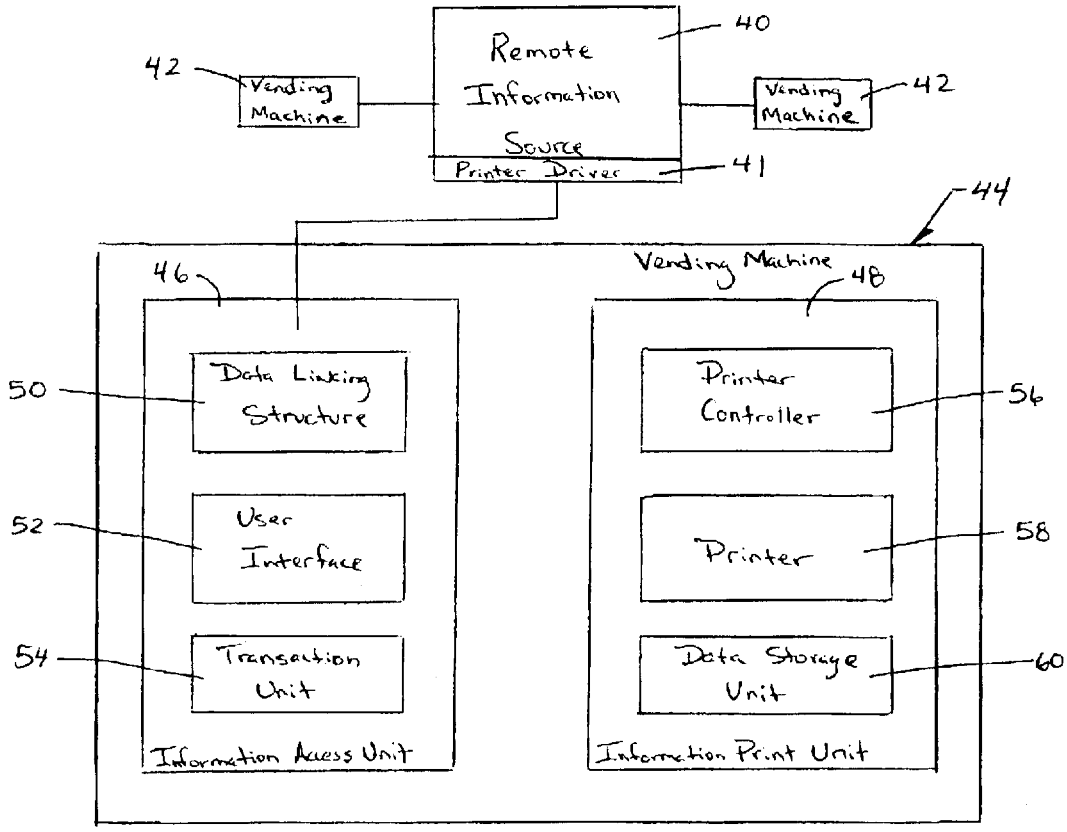
FIG. 4 is a circuit diagram representing an electronic information vending machine, and an interconnection between the vending machine and a remote information source network.
Figure 5:
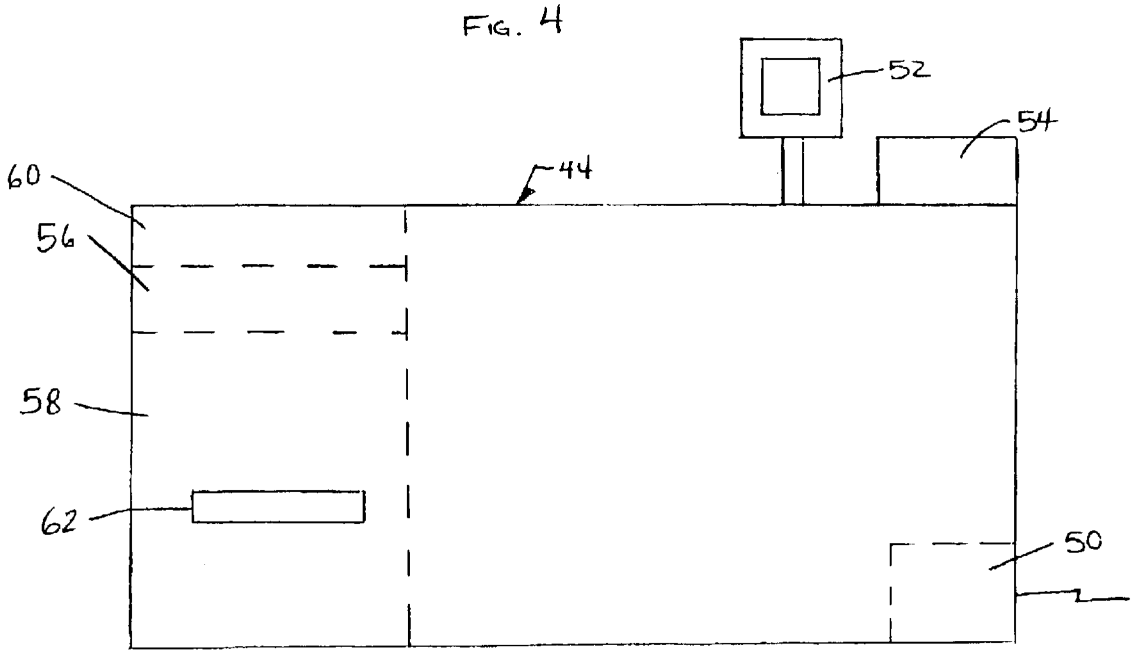
FIG. 5 depicts a vending machine according to the present invention.

Referring now to the drawings, where like reference numerals identify the same or corresponding parts throughout the several views, FIGS. 1 though 3 set forth flow diagrams representing a method of providing information according to the present invention. FIGS. 4 and 5 depict an embodiment of an electronic information vending machine according to the present invention, which can be positioned at various convenient locations, such as in airport terminals or hotel lobbies, in order to provide a user with instant access to various forms of information.

As set forth in the flow diagram of FIG. 1, a method of providing information according to the present invention generally includes a step 10 of retrieving a block of electronic information from a remote source at a predetermined time. Step 10 is performed using a data linking structure (e.g., structure used to transmit data), such as a modem (preferably a high speed modem), which accesses the remote external source via telephone line, a fiber optic cable, a dedicated line, cable, a digital subscriber line (DSL), an ISDN, wireless communication system or any other data connection system which is suitable including a satellite system. The information is advantageously downloaded at a predetermined time. The owner or operator of the vending machine can set the time of the information retrieval to be at a time when the vending machine would not normally have a high volume of use, thereby limiting any disruption to the normal use of the machine. For example, the machine can be set to download the electronic information during a predetermined period of time at night, or one or more times during a twenty-four hour period in which use of the machine is low. The machine could also be set to download the information when it becomes available on the remote source, for example, when the remote source receives data containing a particular newspaper for the following day.

The present invention further advantageously downloads the information in a block (e.g., a predetermined or other amount of information) and stores that information (the storage of the information will be discussed below) so that a user can quickly access the stored information and quickly print out a copy of the information without having to wait for the information to be downloaded on a piecemeal basis as each user selects an item, which can be a time consuming endeavor. The electronic information that is included within the retrieved block of information can be limited to particular types of information, as determined by the owner or operator of the vending machine. For example, particular vending machines might be limited solely to dispensing newspapers or solely to dispensing periodicals, etc., thereby narrowing the type of printing device necessary in that particular vending machine. By downloading the information at a predetermined time, preferably at a time of low use of the machine, and by downloading the information in a block, the present invention provides a user with instant access to a block of information stored within the vending machine.

The remote source can be configured such that a single predetermined source that is maintained by a vendor and which contains predetermined blocks of electronic information is used to provided information to one or an entire network of electronic information vending machines. In such a configuration a vendor operating the predetermined source would provide the electronic information to the predetermined source such that the vending machines could later receive a block of the electronic information from the predetermined source. Alternatively, the remote source can be a variety of sources accessed directly by the data linking structure. In such a configuration the data linking structure of a particular vending machine accesses a variety of remote sources, such as websites on the Internet or a variety of independently operated sources having similar or different types of information, in order to obtain the information to be printed by the vending machine. The information contained in the blocks of electronic information can be limited to predetermined types of information; for example the vending machine can be configured to only dispense magazine, news, or books.

Figure 2:
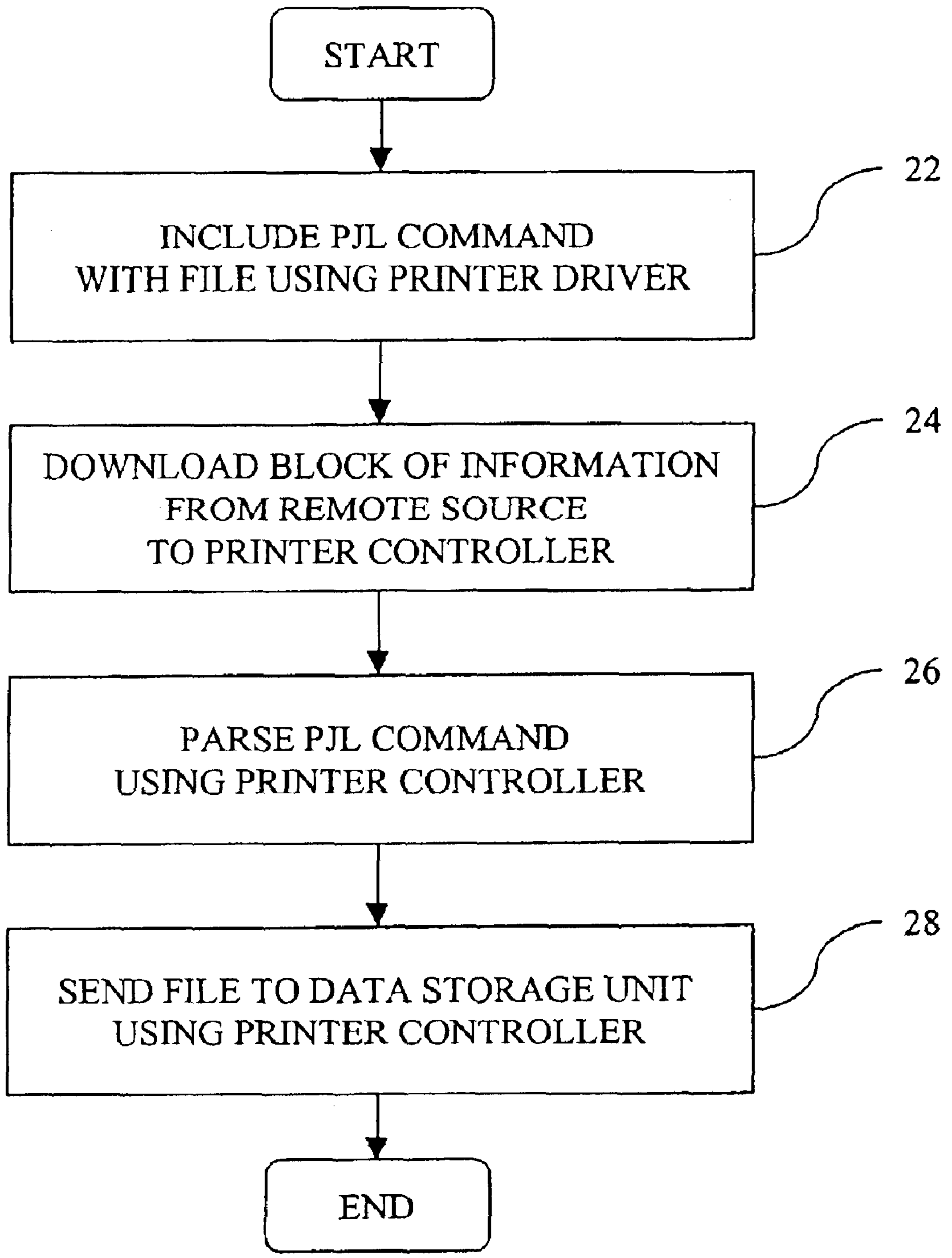
FIG. 2 is flow diagram representing a method of sending a block of electronic information to a data storage unit according to the present invention.

In step 12 of FIG. 1, the block of electronic information retrieved in step 10 is stored on a data storage unit, for example a high capacity hard disk. Alternatively, any other appropriate storage device could be used such as a writeable or rewriteable optical disk, a magneto-optical disk, a floppy disk, or a semiconductor based memory or other suitable disk or non-disk memory. FIG. 2 sets forth a flow diagram of one embodiment of a method of sending a block of electronic information to a data storage unit according to the present invention. In step 22 of the method illustrated in FIG. 2, a printer driver, preferably located at the remote source, creates a print job and includes a printer job language (PJL) command in the block of electronic information from the remote source. In step 24 the block of information is downloaded or transmitted from the remote source to a printer controller located at an electronic information vending machine. The PJL command allows the printer controller to understand that the downloaded information has to be stored in the data storage unit rather than being sent directly to the printer for printing. An example of such a PJL command can be a PJL command with the syntax "@PJL FILE [NAME="filename"]<CR><LF>". Once the file is downloaded to the printer controller, then in step 26 the printer controller parses the PJL command. The parsing allows the parameters of the PJL command to be understood and the PJL command to be properly executed. Once the PJL command is parsed by the printer controller, the file is sent to the data storage unit for storage in step 28.

The method further includes a step 14 illustrated in FIG. 1 in which a user interface is provided that is configured to produce a selection signal based upon an input from a user. Accordingly, a user interface is provided that will allow a user to preferably to select an item for purchase using audio, visual, or tactile representations of an item for selection using various interface devices such as, for example, a liquid crystal display (LCD), a cathode ray tube (CRT) display, a plasma display, a light emitting diode display, speakers, a braille device, a keyboard, a mouse, a voice recognition device, a monitor with input capabilities (such as a touch-screen monitor) and/or any other device that allows a user to display the desired information and to input a selection. Once the user has input a selection based upon the item desired by the user, a selection signal is produced that can be utilized to activate payment procedures and/or retrieve the information for dispensing to the user. The user interface preferably includes a verification sequence where the user is prompted to verify that the selected material has been properly selected and indicates the amount of payment due in order for the vending machine to dispense the selected materials.

Figure 3:
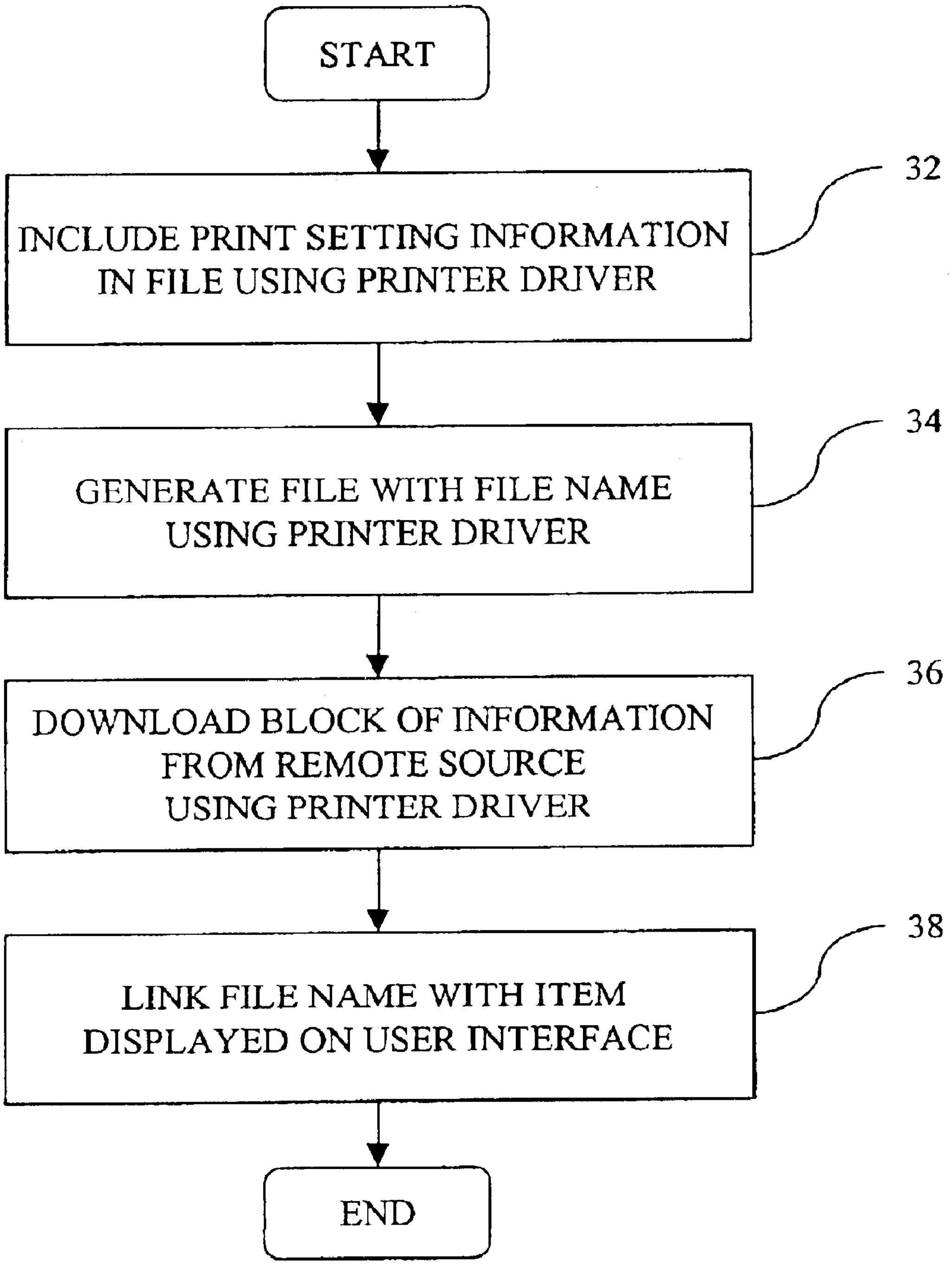
FIG. 3 is a flow diagram representing a method of linking a file with a user interface according to the present invention.

FIG. 3 sets forth a flow diagram of one embodiment of a method of linking a file with a user interface according to the present invention. In the method illustrated in FIG. 3, step 32 includes using the printer driver to provide print setting information in the block of electronic information. The printer driver will embed the configuration information used during printing of the electronic information. Depending on the configuration of the printer and the information to be printed, the printer driver predetermines the format of the output, such as printing on both sides of a sheet, printing and then stapling, printing in a booklet format, etc. In step 34, the printer driver then generates a file name or designation for each segment of information pertaining to a particular document in the block of electronic information, and in step 36 the block of information is downloaded from the remote source to the electronic information vending machine using the printer driver. The file name is then linked with an item displayed on the user interface in step 38. For example, in a preferred embodiment a graphical representation, such as an icon, is placed on a visual display of the user interface corresponding to a portion of the block of electronic information retrieved from the remote source. The graphical representation thereby provides a link by which the user can select a portion of the block of information by selecting the graphical representation on the user interface.

In step 16 illustrated in FIG. 1, the present invention performs the step of receiving and verifying a payment based upon the selection signal input by the user. The various information which is available may cost different amounts. Thus in the preferred embodiment, the user selects the desired information and it can then be determined how much the information will cost. Alternatively, the user can pay or have his or her credit account verified before selection. The invention will preferably include various devices that will allow for the payment of the cost of the materials selected by the user. For example, the invention preferably includes coin and bill receiving devices, a device to provide change to the user, a device to input credit card or debit card payments which is a card reading device, as well as any other means of providing payment. The credit or debit card reading device may be implemented using any desired structure including magnetic card readers and optical card readers, such as bar code readers, for example. Once the payment has been received by the invention, and the payment in full status or appropriate credit is verified, the invention is directed to begin the process of dispensing the materials purchased.

Step 18 begins the process of dispensing the materials purchased by retrieving a portion of the block of electronic information from the data storage unit based upon the selection signal. The invention retrieves the file of information corresponding to the selection or selections made by the user at the user interface generally following payment and payment verification.

In step 20 the invention prints on a medium the portion of the block of electronic information selected by the user. The medium is a human readable medium such as a paper print out or a machine readable medium such as a disk. In the preferred embodiment, the portion of the block of information selected is printed in a conventional format, for example, if the portion selected by the user is a magazine, then the invention prints and dispenses the portion selected in a conventional magazine format. As will be readily apparent to one of skill in the art, the selected portion of information can be printed in a variety of formats including, but not limited to, the conventional format of that medium of information, user selected formatting, or standard formatting either included in the block or portion of information at the remote source or standard formatting added to the block or portion of information at the vending machine. Moreover, any desired printing device may be utilized including any type of color or black and white printer. As an alternative, the information may be dispensed on a computer readable medium such as a disk or a memory card.

FIGS. 4 and 5 depict an embodiment of an electronic information vending machine according to the present invention. The above discussion of the method according to the present invention with regard to FIGS. 1 through 3 applies to the operation and structure of the embodiment depicted in FIGS. 4 and 5, and therefore some of the details described previously will not be reiterated in order to avoid unnecessary repetition.

The embodiment of the present invention as depicted in FIGS. 4 and 5 is an electronic information vending machine 44 (or EVIM). The vending machine 44 is configured to be connected using a wired connection, an optical connection, or a wireless communication system to a remote information source 40. The remote source 40 can be connected to a plurality of additional electronic information vending machines 42. The remote source 40 includes a printer driver 41 which is preferably a piece of software utilized to format and/or transmit information. Alternatively, any type of software or logic may be used to format and transfer the information. The embodiment of the vending machine 44 depicted in FIG. 4 includes an information access unit 46 and an information print unit 48, which are generally housed within a single structure. The information access unit 46 of the vending machine 44 includes a data linking structure 50, a user interface, and a transaction unit 54. The information print unit 48 of the vending machine 44 includes a printer controller 56, a printer 58, and a data storage unit 60.

The data linking structure 50 retrieves or receives a block of electronic information from a remote source at a predetermined time. The data linking structure 50 is a device such as a modem or other similar device that provides for the receipt and transfer of information via either wired or wireless communication. One such data linking structure 50 is a modem that allows for the connection to the Internet or other remote information source via an external wiring, such as telephone lines or dedicated lines, or via wireless analogy or digital wireless communication systems. The data linking structure 50 is connected to the printer driver 41 to allow for the transfer of the block of information from the remote source 40 to the data storage unit 60 via the printer controller 56. The user interface 52 produces a selection signal based upon an input from a user. A user interface 52 is provided that will allow a user to preferably to select an item for purchase using audio, visual, or tactile representations of an item for selection using various interface devices such as, for example, an LCD or CRT display, speakers, a braille device, a keyboard, a mouse, a voice recognition device, a monitor with input capabilities or any other device that allows a user to input a selection. The user interface 52 is connected to the printer controller 56 and to the transaction unit 54. The transaction unit 54 receives and verifies a payment based upon the selection signal. The transaction unit 54 includes coin and bill receiving devices, a device to provide change to the user, a device to input credit card or debit card payments, as well as any other means of providing payment. The transaction unit 54 and the user interface 52 interact during payment and verification of payment procedures.

The printer controller 56 is connected to both the printer 58 and the data storage unit 60. The data storage unit 60, such as, for example, a hard disk, is included that is configured to store the block of electronic information received from the remote source 40. The printer 58 is configured to receive or retrieve a portion of the block of electronic information from the data storage unit 60 and printer controller 56 based upon the selection signal generated by the user interface 52 in response to a user input and print on a medium the portion of the block of electronic information selected by the user. The structure and capabilities of the printer 58 included within the vending machine 44 corresponds to the format of the information being printed. For example, if the vending machine is configured to print the information in a conventional magazine format, a conventional newspaper format, a conventional book format, etc., the vending machine is equipt with a printer and printer medium that is suitable for dispensing a final product in the desired format. The vending machine 44 dispenses the final product via an opening 62 in the housing thereof The printer may be any type of printer and may be a color printer or a black and white printer. Exemplary embodiments of the printer include but are not limited to impact printers, inkjet printers, laser printers, LED printers, dye sublimation printers, and thermal wax transfer printers, for example. In addition to or as an alternative to the use of a printer, a memory writer/reader such as a disk drive or memory card writer/reader may be utilized.

In the preferred embodiment of the invention, the vending machine 44 includes a printer controller 56 configured to receive the block of electronic information from the data linking structure 50 and transfer the block of electronic information to the data storage unit 60. The printer driver 41 generally located at the remote information source 40 is also configured to provide print setting information in the block of electronic information sent to the data linking structure 50. The printer driver 41 includes a PJL command in the block of electronic information sent to the data linking structure 50 and send the block of information to the data storage unit 60 via the printer controller 56. The printer controller 56 then parses the PJL command before sending the block of electronic information to the data storage unit 60.

The printer driver 41 is preferably included with the remote information source 40, where the owner/operator uses the printer driver 41 to create the print data. The printer driver 41 generates commands to inform the printer that the print data will not be printed immediately, but rather the information will be stored in the data storage unit 60. The printer driver 41 also embeds the configuration information in the block of information. Depending on the configuration of the printer and the information to be printed, the printer driver predetermines the format of the output such as printing on both sides of a sheet, printing and stapling, printing in a booklet format, etc. This information is created with the printer driver 41 and downloaded to the data storage unit 60. The printer 58 includes the printer hardware, for example, which includes various paper trays, paper sizes, duplex unit, stapling unit, etc.

In the preferred embodiment of the present invention the printer driver 41 is configured to generate a file name for the block of electronic information, where the file name corresponds to a display item contained on the user interface 52. The user interface 52 is configured to provide a graphical representation on a visual display corresponding to a portion of the block of electronic information retrieved from the remote source 40, thereby allowing a user to select a particular portion of the block of information by simply selecting, for example, an icon on the user interface 52 that includes an interactive display.

Figure 6:
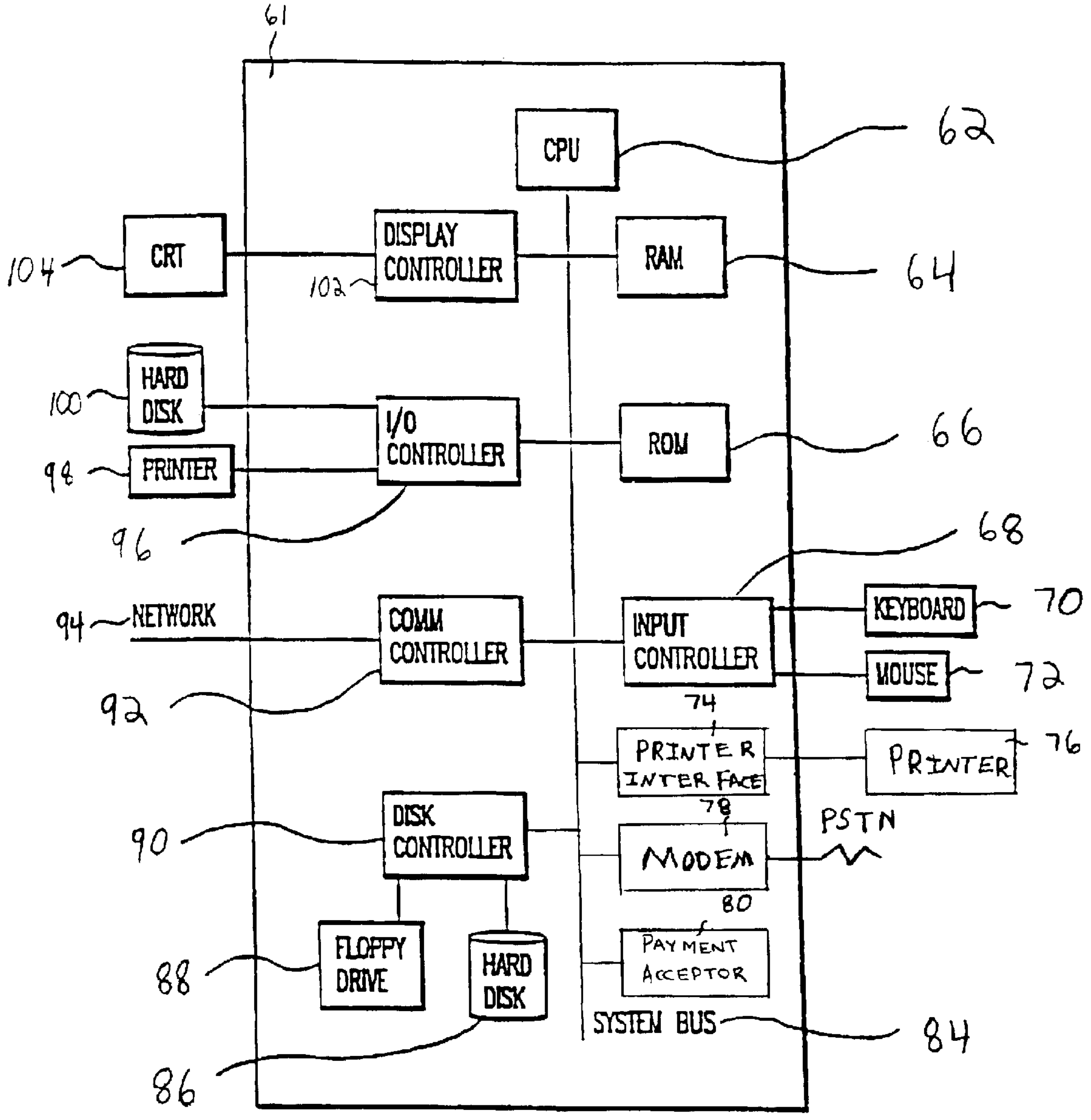
FIG. 6 illustrates an embodiment of a computer or a computer/controller machine utilized by the present invention.

FIG. 6 illustrates a computer or computer/controller machine 61 which may be utilized with the present invention, for example, as one or all of the remote information source 40, EIVM 42, 44, data linking structure, user interface, transaction unit, printer driver, printer, and/or data storage unit of FIGS. 4 and 5. FIG. 6 provides an embodiment of the internal structure of the present invention for general illustrative purposes.

In the computer or computer/controller of FIG. 6, a CPU 62 is utilized to control the device 61. Preferably, the CPU 62 is a microprocessor or a microcontroller, but other types of controlling devices or processing units may be utilized. A RAM 64 serves as a working memory, and a ROM 66 stores instructions which are executed by the CPU 62 in order to control the device 61. An input controller 68 interfaces with a keyboard 70 and a mouse 72 which are utilized to input commands and information from a user. A printer interface is connected to any desired type of printer 76. A modem 78 may be utilized to transmit information over a PSTN and may be implemented by a modem capable of transmitting data. A payment acceptor 80 is connected to the system to accept and verify payment by the user and can include an outside telephone connection that allows the payment acceptor to verify the availability of funds, for example, in credit card or debit card payments. A system bus 84 connects the various components of the device 61.

A disk controller 90 is connected to a floppy disk drive 88 and a hard disk drive 86. The hard disk drive may be utilized to store the profile or capabilities information discussed herein. As an alternative, the profile information or capabilities information may be stored in another type of non-volatile memory such as a CMOS memory or a RAM having a battery back up. Alternatively, a flash memory or an EEPROM may be utilized to store the desired information. A communication controller 96 interfaces the device 61 with a network 94 for connection to another type of network interface to the remote information source. An input/output controller 96 is connected to a printer 98 and a hard disk drive 100 which may be external to the device which houses the components of the device 61. A display controller 102 is connected to a CRT 104 but an alternative type of display, such as an LCD display, or a plasma display, for example, may be utilized.

The mechanisms and processes set forth in the present invention may be implemented using a conventional general purpose microprocessor programmed according to the teachings of the present specification, as will be appreciated to those skilled in the relevant arts. Appropriate software coding can be prepared by skilled programmers based on the teachings of the present disclosure, as will be apparent to those skilled in the relevant arts. The present invention may also be implemented utilizing alternative structure such as through special purpose or specially programmed hardware such as programmable logic arrays, and any other type of processing system.

The present invention also includes a computer based product which may be hosted on a storage medium and includes instructions which can be used to program a computer to perform a process in accordance with the present invention. The storage medium can include, but is not limited to, any type of disk including floppy disks, optical disks, CD-ROMs magneto-optical disks, ROMs, RAMs, EPROMs, EEPROMs, flash memory, magnetic or optical cards, or any other type of media suitable for storing electronic instructions.

Numerous variations of the present invention are possible in light of the above teachings. It is therefore to be understood that within the scope of the appended claims, the present invention can be practiced other than as specifically described herein.

What is claimed is:

1. An apparatus for providing information on a medium, the apparatus comprising:

a data linking structure adapted to access a remote source that is adapted to provide a designation to a block of electronic information and to provide a formatting command including printing format information in the block of electronic information, the data linking structure configured to retrieve the block of electronic information from the remote source;

a data storage unit configured to store the block of electronic information retrieved from the remote source;

a user interface configured to produce a selection signal, which corresponds to the designation, based upon an input from a user;

a printer controller configured to receive, based upon the selection signal, the block of electronic information from the data storage unit, the printer controller configured to parse the formatting command before sending the block of electronic information to the data storage unit;

a printer configured to print on the medium the block of electronic information received by the printer controller; and a transaction unit configured to receive and verify a payment based upon the selection signal.

2. The apparatus according to claim 1, wherein the designation is linked to an item displayed on the user interface, and wherein the user interface is configured to produce the selection signal when the item is selected by the user.

3. The apparatus according to claim 1, wherein the printer controller is configured to receive the block of electronic information from the data linking structure and transfer the block of electronic information to the data storage unit.

4. The apparatus according to claim 1, wherein the user interface is configured to provide a graphical representation on a visual display corresponding to the block of electronic information retrieved from the remote source.

5. The apparatus according to claim 1, wherein the user interface includes an interactive display.

6. The apparatus according to claim 1, wherein the block of electronic information is limited to a predetermined type of information.

7. The apparatus according to claim 1, wherein the medium is a human readable paper printout.

8. An apparatus for providing information on a medium, comprising:

an information access unit including:

means for providing a designation to a block of electronic information provided to a remote source and for providing a formatting command including printing format information in the block of electronic information, means for retrieving the block of electronic information from the remote source, and means for producing a selection signal, which corresponds to the designation, based upon an input from a user;

means for verifying a payment based upon the selection signal; and an information print unit including a data storage unit, a printer controller and a printer, the data storage unit storing the block of electronic information retrieved from the remote source, the printer controller being configured to retrieve the block of electronic information from the data storage unit based upon the selection signal and the printer being configured to print the block of electronic information on a medium, wherein the printer controller is configured to parse the formatting command before sending the block of electronic information to the data storage unit.

9. A system for providing information on a medium, the system comprising:

a remote source including a printer driver adapted to provide a designation to a block of electronic information and to provide a formatting command including printing format information in the block of electronic information; and an apparatus comprising:

a data linking structure adapted to communicate with the remote source, the data linking structure being configured to retrieve the block of electronic information from the remote source;

a data storage unit configured to store the block of electronic information retrieved from the remote source;

a user interface configured to produce a selection signal, which corresponds to the designation, based upon an input from a user;

a printer controller configured to receive, based upon the selection signal, the block of electronic information from the data storage unit, the printer controller being configured to parse the formatting command before sending the block of electronic information to the data storage unit;

a printer configured to print on the medium the block of electronic information retrieved by the printer controller; and a transaction unit configured to receive and verify a payment based upon the selection signal.

10. The system according to claim 9, wherein the designation is linked to an item displayed on the user interface, and wherein the user interface is configured to produce the selection signal when the item is selected by the user.

11. The system according to claim 9, wherein the printer driver is configured to provide print setting information in the block of electronic information.

12. The system according to claim 9, wherein the printer driver is configured to generate a file name as the designation for the block of electronic information, the file name corresponding to a display item on the user interface.

13. The system according to claim 9, wherein the printer driver is configured to include a printer job language command in the block of electronic information and send the block of information to the data storage unit.

14. The system according to claim 9, wherein the remote source is a single predetermined source containing predetermined blocks of electronic information.

15. The system according to claim 9, wherein the remote source is a variety of sources accessed directly by the data linking structure.

16. A method of providing information comprising the steps of:

providing a block of electronic information to a remote source, wherein a designation is provided to the block of electronic information provided to the remote source and a formatting command including printing format information is provided in the block of electronic information;

retrieving the block of electronic information from the remote source;

storing on a data storage unit the block of electronic information retrieved from the remote source, wherein the formatting command is parsed before sending the block of electronic information to the data storage unit;

providing a user interface configured to produce a selection signal, which corresponds to the designation, based upon an input from a user;

verifying a payment based upon the selection signal;

retrieving the block of electronic information from the data storage unit based upon the selection signal; and printing the block of electronic information on a medium.

17. The method according to claim 16, wherein the designation is linked to an item displayed on the user interface, and wherein the user interface is configured to produce the selection signal when the item is selected by the user.

18. The method according to claim 16, further comprising the step of providing the printing format information in the block of electronic information using a printer driver.

19. The method according to claim 16, further comprising the step of generating a file name as the designation for the block of electronic information using a printer driver, wherein the file name corresponds to a display item contained on the user interface.

20. The method according to claim 16, further comprising the step of providing a graphical representation on a visual display of the user interface corresponding to a portion of the block of electronic information retrieved from the remote source.

* * * * *

UNITED STATES PATENT AND TRADEMARK OFFICE

CERTIFICATE OF CORRECTION

PATENT NO. : 6,816,752 B1
DATED : November 9, 2004
INVENTOR(S) : Wang

It is certified that error appears in the above-identified patent and that said Letters Patent is hereby corrected as shown below:

Title page,
Items [45] and [*] Notice, should read as follows:

-- [45] Date of Patent: * Nov. 9, 2004

[*] Notice: Subject to any disclaimer, the term of this patent is extended or adjusted under 35 U.S.C. 154(b) by 0 days.

This patent is subject to a terminal disclaimer. --

Signed and Sealed this

Eighth Day of February, 2005

JON W. DUDAS
*Director of the United States Patent and Trademark Office*